Patented June 1, 1937

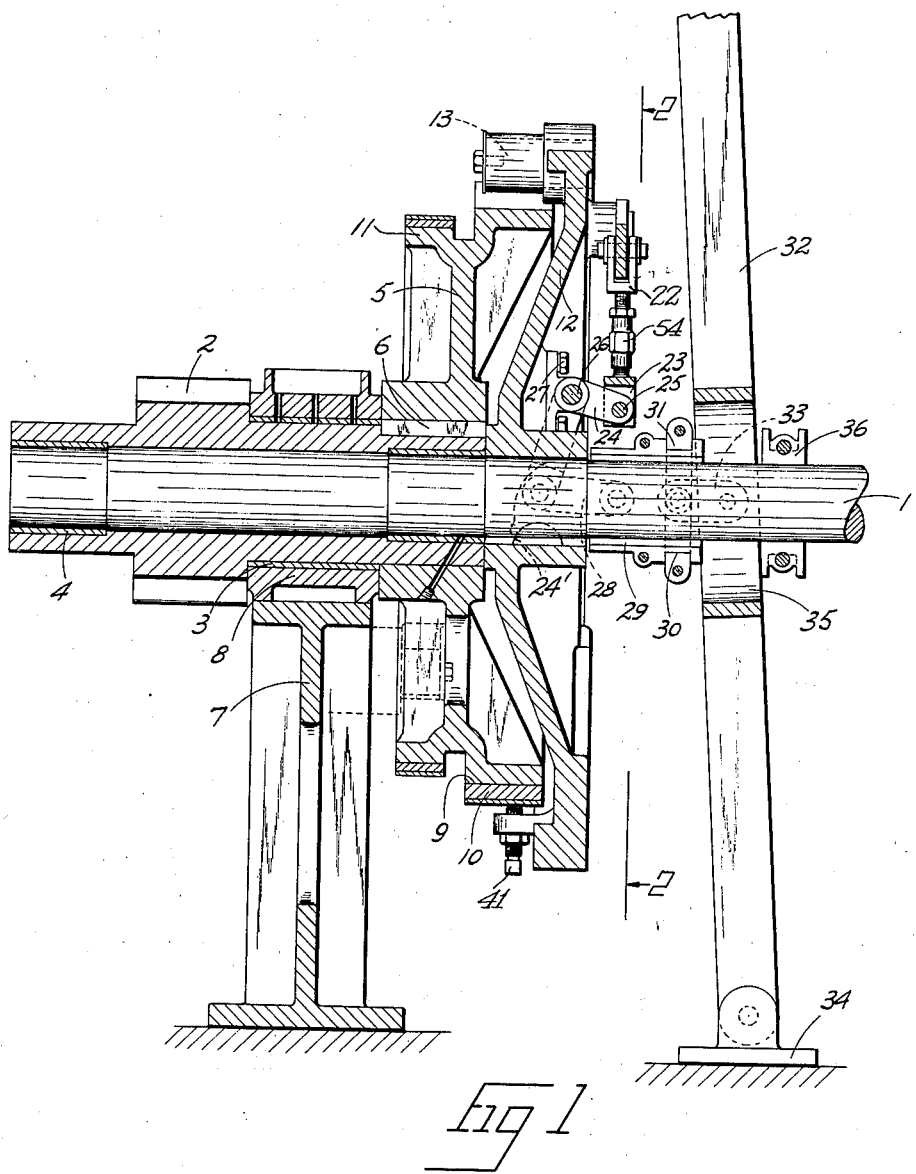

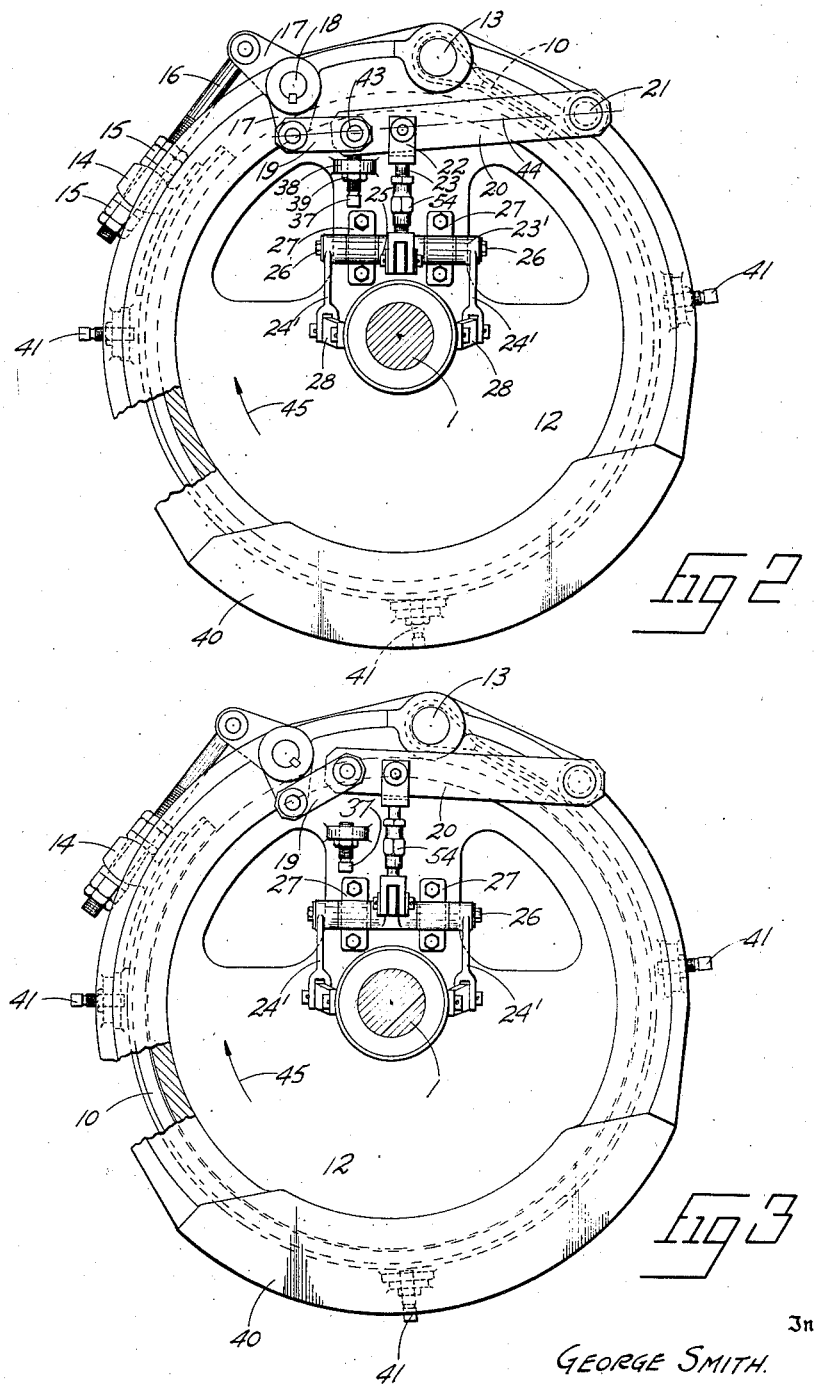

2,082,726

UNITED STATES PATENT OFFICE 2,082,726

CLUTCH

George Smith, Baltimore, Md., assignor to Ellicott Machine Corporation, Baltimore, Md., a corporation of Maryland Application September 28, 1933, Serial No. 691,364

3 Claims. (Cl. 192—80)

This invention relates to clutches and more particularly to the type of clutch in which frictional engagement is effected between driving and driven members at will in order to connect or release the driven member from the driving member.

My improved clutch mechanism includes a very simple and effective means for locking the clutch in engagement in which rotation of the parts assists in the locking action, and it is among the objects of my invention to provide a simple, rugged and effective clutch mechanism adapted to complete and maintain a driving connection between rotating driving and driven members.

The above and other objects of my invention will appear from the following description of a preferred embodiment thereof, reference being had to the accompanying drawings, in which—

Figure 1 is a vertical cross section through my clutch mechanism applied to effect driving connection between a power driven shaft and a gear or the like mounted on the shaft, and showing the clutch in engaged position.

Figure 2 is an end view of my clutch mechanism taken on line 2—2 of Figure 1.

Figure 3 is a view similar to Figure 2 but illustrating the clutch in disengaged position.

Referring now to the drawings the shaft 1 is adapted to rotate continuously and may be driven by any suitable exterior power source (not shown). Rotatably mounted on the shaft 1 is a pinion gear 2 which is provided with outwardly extending hub portions 3 and 4. A friction wheel member 5 is secured to the hub portion 3 of the pinion 2 by the key 6 and thus is adapted to rotate with and drive the pinion 2. A bearing bracket 7, provided with a bearing 8, supports the pinion 2 and thus also serves as a support for the shaft 1 and the entire clutch mechanism.

The friction wheel 5 is provided with a smooth, preferably cylindrical, outer friction surface 9 with which the friction band 10 engages as will be more fully described later. A brake drum 11 may also be carried by the friction wheel 5 if desired although this feature is not a part of the present invention and is not essential to my clutch mechanism.

The driving friction disc 12 is keyed to the shaft 1 and consequently rotates continuously therewith. An anchor pin 13 extends horizontally outwardly from the disc 12 and lies over the friction face 9 of the wheel 5. A flexible friction band 10 is anchored on the pin 13 and is wrapped around the friction face 9 of the driven friction wheel 5. This band may be of any suitable material having a sufficiently high coefficient of friction and proper wear resisting properties, and carries a bracket member 14 at its free end. Adjustably secured to the bracket 14 by the nuts 15 is a rod 16 which is pivotally connected at its outer end to a bell crank lever 17. This bell crank lever 17 includes a shaft portion 18 which extends through and has a bearing in the driving disc 12, the upper lever arm of the bell crank lever 17 (Figure 2) lying on the side of the driving disc 12 nearest the pinion 2, while the lower lever arm lies on the opposite side of the disc 12. One end of the toggle link 19 is pivotally connected to the lower end of the lower arm of the bell crank lever 17. The opposite end of the link 19 is pivotally connected to another toggle link 20 to form the central pivot of the toggle linkage, and the other end of the link 20 is pivotally mounted on a pin 21 which is supported by the driving disc 12. From the above description it will be seen that the links 19 and 20 form a toggle, one end of which is relatively fixed at the pin 21 while the other end is free to move and transmits its movement to the lower arm of the rotatable bell crank lever 17.

A yoke member 22 is pivotally secured to the link 20 intermediate its ends and a rod 23, preferably provided with a turn buckle connection 54 for adjustment of its length, connects the yoke 22 to a yoke 23' which is connected to one end of a bell crank lever 24 by the pin 25. The bell crank lever 24 is pivoted at its fulcrum on a pin 26 which is rotatably supported in brackets 27 mounted on the driving disc 12. The pin or shaft 26 carries the two downwardly extending arms 24' of the bell crank lever 24. These arms 24' are mounted at the opposite ends of the shaft 26 and extend downwardly on either side of the shaft 1. Links 28 are disposed on opposite sides of the shaft 1 and connect the lower ends of the lever arms 24' to the sliding clutch collar 29. This clutch collar 29 is adapted to slide longitudinally on the shaft 1 and is provided on its outer surface with a groove 30 in which lies a suitable thrust bearing member 31. This thrust member 31 does not rotate with the collar 29 and the shaft 1 and is secured to the clutch operating lever 32 by links 33. The lever 32 is preferably pivoted at its lower end to any suitable fixed support 34 and is provided with a yoke portion 35 which is adapted to encompass the shaft 1. It will be seen that the links 33 are connected to the opposite sides of the yoke portion 35 of the lever 32. A stop collar 36 is preferably clamped or otherwise secured to the shaft 1 and forms an abutment against which the right hand end of the clutch collar 29 will strike when the clutch is in its completely disengaged position.

In order to limit the movement of the clutch mechanism in engaging direction and to form a positive stop when the proper engaged position of the parts is reached I have provided an adjustable screw abutment member 37 (Figures 2 and 3). This abutment screw 37 has threaded engagement with a lug 38 on the friction disc 12 and a lock nut 39 is provided to lock the screw in proper position.

As all of the above described clutch operating linkage, with the exception of the operating lever 32, the links 33 and the thrust member 31, rotate with the friction disc 12 and the thrust member 31, rotate with the friction disc 12 and the shaft 1 and as all of this apparatus is disposed on one side of the shaft 1, I have found it advisable in order to properly balance the rotating apparatus, to form a counter-weight 40 on the side of the friction disc 12 opposite the clutch operating mechanism. I have also found that smooth engagement of the clutch mechanism can be facilitated and the apparatus adjusted to take up wear of the friction band 13 by means of the adjusting screws 41 which are disposed about the periphery of the driving disc 12 and are adapted to engage the outer surface of the friction band 13.

When the parts are in the positions shown in Figures 1 and 2 the friction band 13 is drawn tightly around the friction surface 9 of the driven wheel 5 and the driving connection between the parts is completed. The operating lever 2 has been moving to its extreme left position. This movement of the operating lever 2 is transmitted through the links 33 and the thrust member 31 to the clutch collar 29. The links 28 transmit the movement from the collar 29 to the lower arms 24' of the bell crank lever 24. When the lower arms 24' of the bell crank lever 24 move toward the pinion 2 the upper arm of the lever will move downwardly thus exerting a downward pull upon the connecting rod member 23 and the toggle link 20.

When the clutch is in its disengaged position the toggle links 19 and 20 are in the position shown in Figure 3 and it will be seen that a downward movement of the link 20 will cause the toggle links 19 and 20 to straighten out thus increasing the distance between their extremities and moving the lower arm of the bell crank lever 17 to the left into the position shown in Figure 2. This movement of the lower arm of the bell crank 17 will move the upper arm of this lever upwardly and will exert a pull on the end of the friction band 10 through the rod 16 and the bracket 14. Thus, when the toggle members move from the position shown in Figure 2 to that shown in Figure 3, the friction band 10 will be moved from its disengaged position into its engaged position in which a driving connection is completed between the disc 12 and the wheel 5.

As will be seen from Figure 2, the stop screw 37 is so set that, when the clutch operating lever has been moved into fully engaged position the center pivot point 43 of the toggle arms 19 and 20 will lie slightly below the dot and dash line 44 drawn between the pivot points at the outer extremities of the toggle links 19 and 20, which line may be considered to indicate the central or fully extended position of the toggle arms. Thus, any force which might be transmitted to the toggle from the friction band 10 through the bell crank arm 17 will merely tend to increase the force with which the toggle link 20 bears against the stop screw 37 and thus accidental or undesired disengagement of the clutch is positively prevented. The arrow 45 (Figures 2 and 3) indicates the normal direction of rotation of the driving disc 12.

By adjusting the screw 37 so that the point 43 will lie only slightly below the line connecting the outer ends of the toggle links when the clutch is engaged the locking action is obtained without causing the tension on the friction band to be appreciably released after it reaches its maximum value when the links 19 and 20 are in a perfectly straight line. Thus, the self-locking action is obtained without reducing the effectiveness of the clutch.

When the clutch operating lever 32 is moved to the right from the position shown in Figure 1 the linkage will operate to move the toggle links 19 and 20 from the positions shown in Figure 2 to those shown in Figure 3. This movement will be transmitted through the bell crank arm 17 to release the tension on the friction band 13 thus permitting the shaft 1 to rotate free of the driven wheel 5 and without transmitting any driving force to the pinion 2.

Although I have described in considerable detail the illustrated embodiment of my invention it will be understood by those skilled in the art that modifications and variations in the specific form herein shown and described may be made without departing from the spirit of my invention. I do not, therefore, wish to be limited to the specific form herein shown and described, but claim as my invention all embodiments thereof coming within the scope of the appended claims.

I claim:

1. In a mechanism of the class described including a driven member and a driving member and a drive shaft for the driving member, means to effect driving engagement between said members including a friction drum and a friction band surrounding said drum, means for contracting the band about the friction drum, comprising a bellcrank lever adjustably connected to said band, means to operate the lever to contract the band about the drum including a toggle linkage having one end anchored to the driving member and the other end connected to the bellcrank lever, a second bellcrank lever supported by the driving member and an adjustable rod for connecting the toggle linkage to the second bellcrank lever at a point spaced from the point of pivot of the toggle elements to each other, said last mentioned bellcrank forming a yoke straddling the drive shaft, a sleeve slidably disposed about the drive shaft and links connecting said sleeve to said yoke and manual means to move the sleeve.

2. In a mechanism of the class described including a driven member and a driving member and a drive shaft, means to effect driving engagement between said members including a friction drum connected to the driven member, a friction band surrounding said drum and supported by the driving member, one end of said band being anchored to the driving member and the other end being connected to means for contracting the band about the friction drum, said contracting means comprising a bellcrank lever pivotally supported by the driving member and having a rod adjustably connected to the free end of said band and the other end connected to one end of the bellcrank lever, means to operate the bellcrank lever comprising a toggle linkage having one end anchored to the driving member and the other end connected to the bellcrank, a second bellcrank lever supported by the driving member and an adjustable rod for connecting the toggle linkage to the second bellcrank lever at a point spaced from the point of pivot of the toggle elements to each other, one end of said last mentioned bellcrank forming a yoke extending on either side of the drive shaft adjacent the driving member, a sleeve slidably disposed about the driving shaft and links connecting said sleeve to said yoke, said sleeve having a peripheral groove, a throwout member rotatably disposed in said groove and a hand lever connected thereto for moving said sleeve longitudinally on the drive shaft.

3. In a clutch mechanism, a driven member having a friction surface, a driving member, a friction band carried by the driving member pivotally connected at one end to the driving member and adapted for frictional engagement with said friction surface, a toggle linkage carried by the driving member, one end of said linkage being pivoted to the driving member, a bell crank lever connected to the other end of the friction band, said toggle being connected to the other end of said bell crank lever whereby movement of said toggle will cause said friction band to be moved into and out of driving engagement with the friction surface of the driven member, said toggle linkage having a pivot point adapted to lie on one side of the fully extended position of said linkage, an abutment adapted to engage the toggle linkage at said pivot point to fix the position where the said pivot point may lie, and means for moving said toggle linkage to effect engagement and disengagement of the clutch connected to said toggle adjacent the said pivot point.

GEORGE SMITH.